US009880599B1

(12) United States Patent
Allen-Ware et al.

(10) Patent No.: US 9,880,599 B1
(45) Date of Patent: Jan. 30, 2018

(54) PRIORITY-AWARE POWER CAPPING FOR HIERARCHICAL POWER DISTRIBUTION NETWORKS

(71) Applicant: International Business Machines Corporation, Armonk, NY (US)

(72) Inventors: Malcolm S. Allen-Ware, Tucson, AZ (US); Thomas W. Keller, Jr., Austin, TX (US); Charles R. Lefurgy, Austin, TX (US); Yang Li, Pittsburgh, PA (US); Karthick Rajamani, Austin, TX (US); Samuel W. Shanks, Coppell, TX (US); Guillermo J. Silva, Austin, TX (US); Eddie L. Smith, Wylie, TX (US); James Yanes, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 15/291,717

(22) Filed: Oct. 12, 2016

(51) Int. Cl.
*G06F 1/26* (2006.01)
*G06F 1/32* (2006.01)
*H04L 29/08* (2006.01)
*H04L 12/24* (2006.01)

(52) U.S. Cl.
CPC .......... *G06F 1/266* (2013.01); *G06F 1/3228* (2013.01); *H04L 41/5022* (2013.01); *H04L 67/10* (2013.01)

(58) Field of Classification Search
None
See application file for complete search history.

(56) References Cited

U.S. PATENT DOCUMENTS

| 7,702,931 | B2 | 4/2010 | Goodrum et al. |
| 7,895,455 | B2 | 2/2011 | Green et al. |
| 8,843,772 | B2 | 9/2014 | Hormuth |
| 8,949,646 | B1 | 2/2015 | Weber et al. |
| 9,261,945 | B2 | 2/2016 | Khatri et al. |

(Continued)

OTHER PUBLICATIONS

Fan, Xiaobo et al., "Power Provisioning for a Warehouse-sized Computer", In Proceedings of the ACM International Symposium on Computer Architecture, San Diego, CA, Jun. 2007, 11 pages.

(Continued)

*Primary Examiner* — Paul J Yen
(74) *Attorney, Agent, or Firm* — Francis Lammes; Stephen J. Walder, Jr.; David B. Woycechowsky

(57) ABSTRACT

A mechanism is provided for throttling power utilized by a set of power consumption devices using priority-aware power capping. Responsive to unassigned power budget remaining in the overall power budget after a minimum power budget value has been assigned to the child device based on an associated priority of the child device, an additional power budget value equal to a remaining priority-based exposed power demand value of the child device is assigned to the child device in response to the remaining unassigned power budget being greater than or equal to the remaining priority-based demanded power value thereby forming a total power budget for the child device. Responsive to design limitations of power distribution equipment in the data processing system or contractual limits of the data processing system being reached, a throttling is implemented by each child device based on the total power budget assigned to the child device.

19 Claims, 7 Drawing Sheets

(56) References Cited

U.S. PATENT DOCUMENTS

| | | | |
|---|---|---|---|
| 2008/0178019 A1 | 7/2008 | McGrane et al. | |
| 2010/0332872 A1 | 12/2010 | Hanson et al. | |
| 2011/0022245 A1 | 1/2011 | Goodrum et al. | |
| 2012/0117390 A1* | 5/2012 | Arndt | G06F 1/3203 713/300 |
| 2012/0324264 A1 | 12/2012 | Hanson et al. | |
| 2013/0047006 A1* | 2/2013 | Brown | G06F 1/3234 713/300 |
| 2013/0226362 A1 | 8/2013 | Jagadishprasad et al. | |
| 2013/0283068 A1 | 10/2013 | Li et al. | |
| 2013/0318371 A1* | 11/2013 | Hormuth | G06F 1/28 713/320 |
| 2013/0339776 A1 | 12/2013 | Jagadishprasad et al. | |
| 2013/0346969 A1* | 12/2013 | Shanmuganathan | G06F 9/4856 718/1 |
| 2015/0177814 A1 | 6/2015 | Bailey et al. | |
| 2016/0162018 A1 | 6/2016 | Rahardjo et al. | |

OTHER PUBLICATIONS

List of IBM Patents or Patent Applications Treated as Related, May 1, 2017, 2 pages.

Raghavendra, Ramya et al., "No "Power" Struggles: Coordinated Multi-level Power Management for the Data Center", ACM, ASPLOS'08, Seattle, Washington, Mar. 1-5, 2008, 12 pages.

* cited by examiner

PRIORITY-AWARE POWER CAPPING FOR HIERARCHICAL POWER DISTRIBUTION NETWORKS

BACKGROUND

The present application relates generally to an improved data processing apparatus and method and more specifically to mechanisms for priority-aware power capping for hierarchical power distribution networks.

A data center is a facility used to house computer systems and associated components, such as servers, telecommunication devices, storage systems, or the like. A data center can occupy one room of a building, one or more floors, or an entire building. Most of the equipment is often in the form of servers mounted in rack cabinets, which are usually placed in single rows forming corridors (so-called aisles) between them. This aisle configuration allows people access to the front and rear of each cabinet. Servers differ greatly in size from one shelf space (1U) servers to large freestanding storage silos, which may occupy many square feet of floor space. Some equipment such as mainframe computers and storage devices are often as big as the rack cabinets themselves and are placed alongside the rack cabinets.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for throttling power utilized by a set of power consumption devices in the data processing system using priority-aware power capping. For each child device in a set of child devices in the data processing system and working from a highest-priority child device to a lowest-priority child device, responsive to unassigned power budget remaining in the overall power budget after a minimum power budget value has been assigned to the child device based on an associated priority of the child device, he illustrative embodiment assigns an additional power budget value equal to a remaining priority-based exposed power demand value of the child device to the child device in response to the remaining unassigned power budget being greater than or equal to the remaining priority-based demanded power value thereby forming a total power budget for the child device. The illustrative embodiment implements a throttling by each child device based on the total power budget assigned to the child device in response to design limitations of power distribution equipment in the data processing system or contractual limits of the data processing system being reached.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
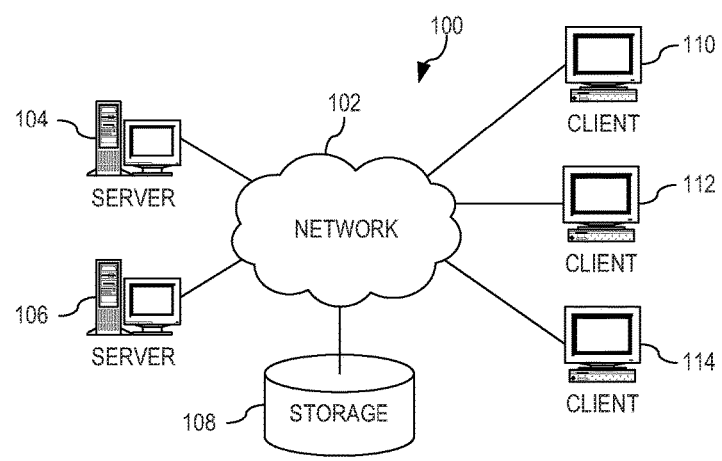
FIG. 1 is an example diagram of a distributed data processing system in which aspects of the illustrative embodiments may be implemented.

As stated previously, data centers are facilities used to house computer systems and associated components, such as servers, telecommunication devices, storage systems, or the like. Each of the computer system within these data centers consume power and, no matter how efficiently data centers are managed, data centers are expanding at an alarming rate and consuming increasing amounts of power. Currently, data centers pay high infrastructure cost and in order to meet service level agreements, the data centers implement a conventional power capping solution with a conservative infrastructure deployment in order not to risk power failure. In one instance, a well-known data center implemented a power capping solution that only utilized 72% of peak power. In instances such as this one, the data centers treat all of the power consumption devices within as if they are governed by a single power controller. However, power distribution is a hierarchy of transformers, switchgear, distribution panels, and power strips and current power capping solutions fail to take into consideration this power distribution hierarchy and associated characteristics when assigning power caps.

The illustrative embodiments provide mechanisms that allocate data center power to the power consumption devices more efficiently than conventional power capping solutions. The mechanisms provide a unique priority-aware power capping solution that utilizes the power distribution hierarchy and associated characteristics as well as the priority assigned to each power consumption device to throttle the power consumption devices to adhere to design limitations of power distribution equipment or contractual limits. By implementing such a unique priority-aware power capping solution, power performance under normal operating within the data center may be increased by 39% thereby allowing for 39% more power consumption devices to be added to the data center and improving overall data center performance and revenue. That is, the illustrative embodiments provide a unique priority-aware power capping solution that is no longer just for power failure situations.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
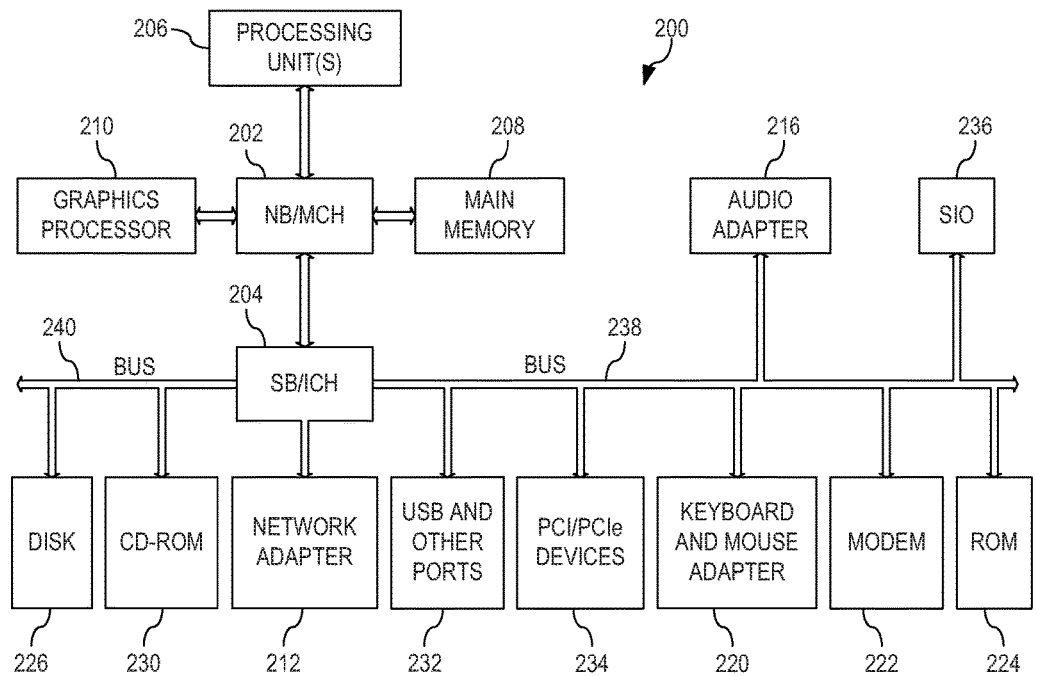
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP)

suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104 may be specifically configured to implement a priority-aware power capping mechanisms for hierarchical power distribution networks. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, and software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates priority-aware power capping for hierarchical power distribution networks.

As noted above, the mechanisms of the illustrative embodiments utilize specifically configured computing devices, or data processing systems, to perform the operations for priority-aware power capping for hierarchical power distribution networks. These computing devices, or data processing systems, may comprise various hardware elements, which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the priority-aware power capping mechanism for hierarchical power distribution network.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. In addition, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
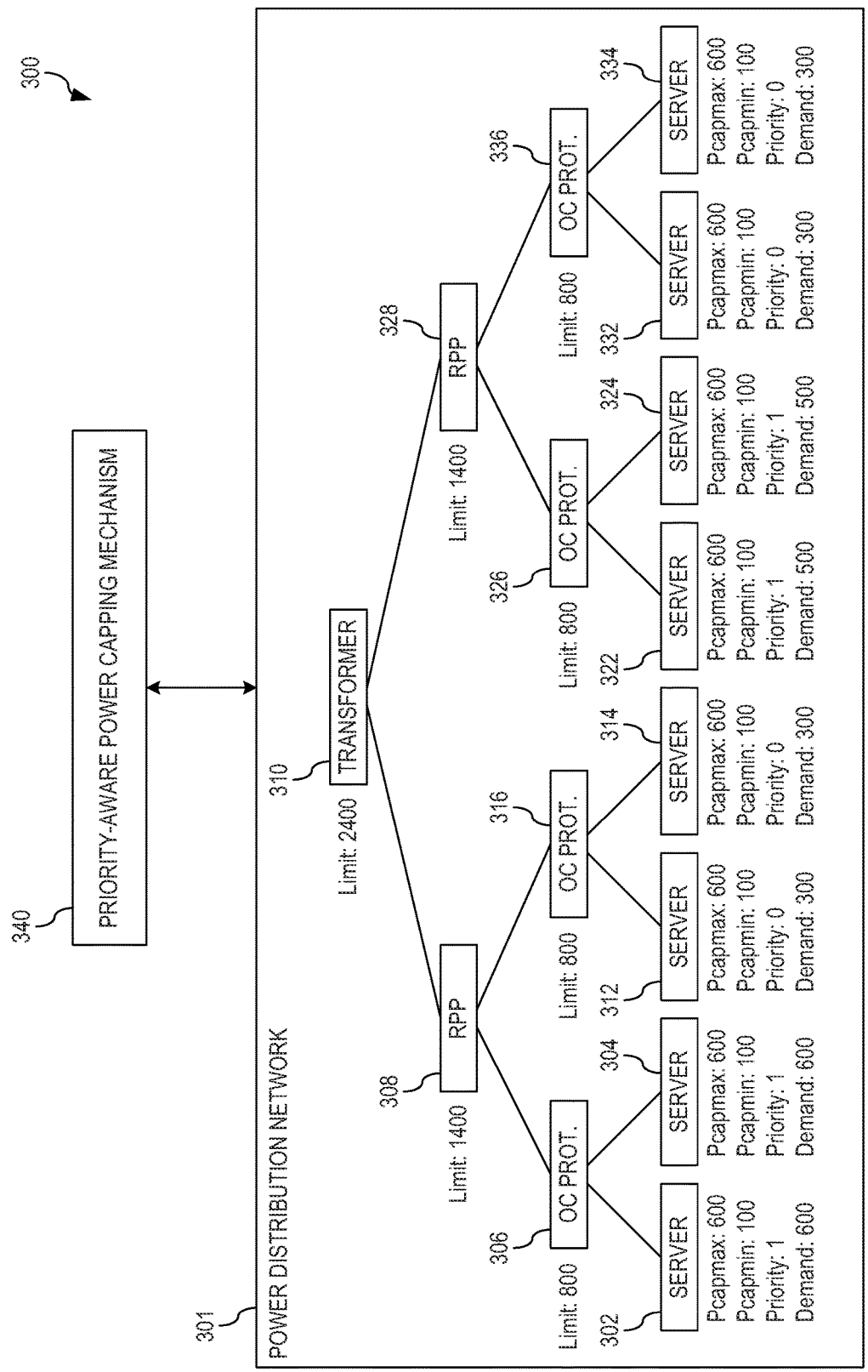
FIG. 3 depicts a functional block diagram of a mechanism for priority-aware power capping for hierarchical power distribution networks in accordance with an illustrative embodiment.

Again, the illustrative embodiments utilize a power distribution hierarchy and associated characteristics of the data center as well as the priority assigned to each power consumption device in the data center to throttle the power consumption devices to adhere to design limitations of power distribution equipment or contractual limits. FIG. 3 depicts a functional block diagram of a mechanism for priority-aware power capping for hierarchical power distribution networks in accordance with an illustrative embodiment. The following description utilizes servers as an exemplary computer system within data center 300; however, utilizes servers is only for the example and the illustrative embodiments recognize that any type of computing resource may be utilized within data center 300, such as servers, telecommunication devices, storage systems, or the like.

As illustrated, data center 300 comprises power distribution network 301 that comprises a set of power consumption devices, i.e. a set of servers 302, 304, 312, 314, 322, 324, 332, and 334. In power distribution network 301, servers 302 and 304 are coupled to overcurrent protection device 306, servers 312 and 314 are coupled to overcurrent protection device 316, servers 322 and 324 are coupled to overcurrent protection device 326, and servers 332 and 334 are coupled to overcurrent protection device 336. As is further illustrated, in power distribution network 301, overcurrent protection devices 306 and 316 are coupled to remote power panel (RPP) 308 and overcurrent protection devices 326 and 336 are coupled to RPP 328. Finally, in power distribution network 301, RPPs 308 and 328 are coupled to transformer 310, which is the main point of entry for electricity into power distribution network 301 of data center 300. While power distribution network 301 is only depicted as comprising a hierarchy of servers, overcurrent protection devices, RPPs, and a transformer, the illustrative embodiments recognize that many other devices may exist in the hierarchy, such as sub-transformers, switchgears, power strips, or the like.

Associated with each device, i.e. each of servers 302, 304, 312, 314, 322, 324, 332, and 334; overcurrent protection devices 306, 316, 326, and 336; RPPs 308 and 328; and transformer 310, are a set of characteristics, such as priority, demand, minimum power cap per priority, maximum power cap per priority, limit, or the like. In normal use, servers 302, 304, 312, 314, 322, 324, 332, and 334 will have an associated priority, demand, minimum power cap per priority, and maximum power cap per priority, while overcurrent protection devices 306, 316, 326, and 336; RPPs 308 and 328; and transformer 310 will have an associated limit. Priority is the assignment associated with the device signifying an importance of the device and may be represented by an integer value, for example from 1 to 10 with 10 being the highest priority and 1 being the lowest priority. Demand refers to the power that the device currently desires to consume without enforcing any power caps. Minimum power cap (Pcapmin) refers to the lowest power cap under which the device may operate. Maximum power cap (Pcapmax) refers to the largest possible power cap under which the device may operate, i.e. the largest possible power consumption of the device. Limit refers to the power limit of a power device.

Figure 4:
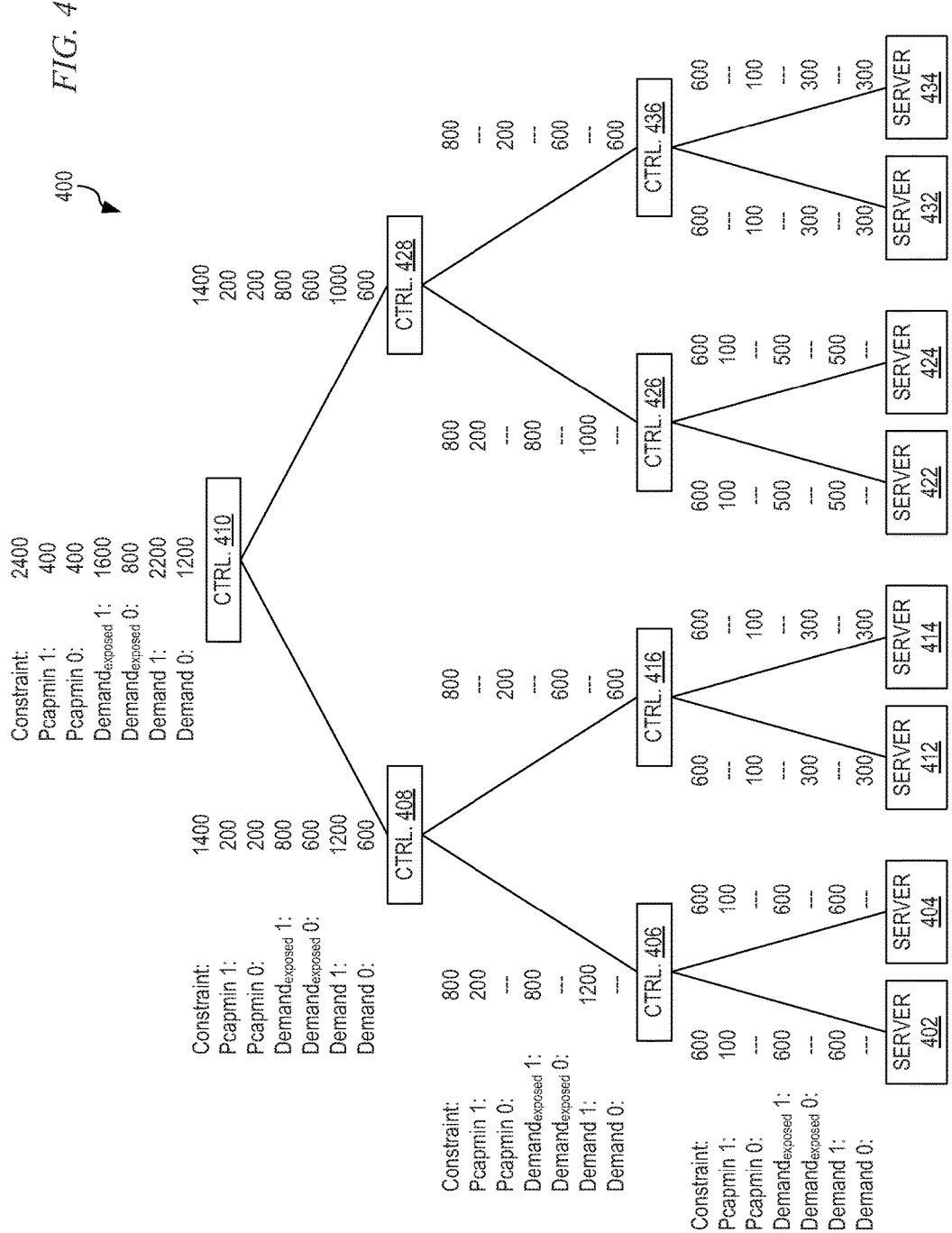
FIG. 4 illustrates determined metrics for each power controller/server in accordance with an illustrative embodiment.

In accordance with the illustrative embodiments, priority-aware power capping mechanism 340 mirrors each power distribution device, i.e. overcurrent protection devices 306, 316, 326, and 336; RPPs 308 and 328; and transformer 310 with a power controller, as is illustrated in FIG. 4 in accordance with an illustrative embodiment. As is depicted in FIG. 4, in power distribution network 400, servers 402, 404, 412, 414, 422, 424, 432, and 434 are power consumption devices that mirror servers 302, 304, 312, 314, 322, 324, 332, and 334 of FIG. 3. As is further depicted in FIG. 4, in power distribution network 400, power controllers 406, 416, 426, and 436 mirror the power distribution devices of overcurrent protection devices 306, 316, 326, and 336 of FIG. 3; power controllers 408 and 428 mirror the power distribution device of RPPs 308 and 328 of FIG. 3; and power controller 410 mirrors the power distribution device of transformer 310 of FIG. 3.

In the illustrative embodiments, in a bottom-up process, priority-aware power capping mechanism 340 summarizes metrics for each server and power controller based on the metrics of any down-stream device(s) and, in a top-down process, assigns power budgets to each power controller/power consumption device based on a determined power budget that takes into consideration the priority of the power consumption devices. Using the characteristics obtained from each of servers 302, 304, 312, 314, 322, 324, 332, and 334; overcurrent protection devices 306, 316, 326, and 336; RPPs 308 and 328; and transformer 310, in the bottom-up process, for each of servers 402, 404, 412, 414, 422, 424, 432, and 434 as well as power controllers 406, 408, 410, 416, 426, 428, and 436, priority-aware power capping mechanism 340 initially summarizes metrics, for example, in Watts, Amps, or the like, for each server/power controllers based on the associated characteristics. These metrics include:

Constraint: The maximum amount of power that is allowed to flow through the power controller/server and the power controllers/servers downwards.

For any priority j of the power controller/server:
Minimum power cap per priority (Pcapmin j): The minimum power budget that the power controller/server requires to receive for the priority.
Exposed power demand per priority (Demand$_{exposed}$ j): The power demand that the power controller/server exposes to its parent power controller for the priority.
Power demand per priority (Demand j): For a power controller, the total power demand that the servers with the priority under the power controller desire to utilize. For a server, the power demand is the power consumption of the server when power capping is not enforced.

With respect to servers 402, 404, 412, 414, 422, 424, 432, and 434, priority-aware power capping mechanism 340 summarizes the metrics for each server using one or more of the following equations as follows:

Constraint=Pcapmax

Pcapmin j=Pcapmin

Demand$_{exposed}$ j=max{Demand,Pcapmin}

Demand j=max{Demand,Pcapmin} where Demand refers to the power that the device currently consumes without enforcing any power caps, Pcapmin refers to the lowest power cap that the device can operate under, Pcapmax refers to the largest possible power cap that the device can operate under, i.e. the maximum power consumption for the server, and j is the instant priority being considered.

In order to provide an example of how these determinations would be conducted, using the exemplary individual characteristics associated with servers 302 and 304 from FIG. 3, for each of servers 402 and 404, priority-aware power capping mechanism 340 would determine:

Constraint=Pcapmax=600

Pcapmin 1=Pcapmin=100

Demand$_{exposed}$ 1=max{Demand,Pcapmin}=max{600, 100}=600

Demand 1=max{Demand,Pcapmin}=max{600, 100}=600.

Using the exemplary individual characteristics associated with servers 312, 314, 332, and 334 from FIG. 3, for each of servers 412, 414, 432, and 434, priority-aware power capping mechanism 340 would determine:

Constraint=Pcapmax=600

Pcapmin 0=Pcapmin=100

Demand$_{exposed}$ 0=max{Demand,Pcapmin}=max{300, 100}=300

Demand 0=max{Demand,Pcapmin}=max{300, 100}=300.

Using the exemplary individual characteristics associated with servers 322 and 324 from FIG. 3, for each of servers 422 and 424, priority-aware power capping mechanism 340 would determine:

Constraint=Pcapmax=600

Pcapmin 1=Pcapmin=100

Demand$_{exposed}$ 1=max{Demand,Pcapmin}=max{500, 100}=500

Demand 1=max{Demand,Pcapmin}=max{500, 100}=500.

Then, with respect to each of power controllers 406, 408, 410, 416, 426, 428, and 436, priority-aware power capping mechanism 340 summarizes the metrics for each power controller using one or more of the following equations as follows:

$$\text{Constraint} = \min\left\{\text{Limit}, \sum_i \text{Constraint } ij\right\}$$

$$\text{Pcapmin } j = \sum_i \text{Pcapmin } ij$$

$$\text{Demand}_{exposed} j =$$
$$\min\left\{\text{limit} - \sum_{k<j}\text{Pcapmin } k - \sum_{k>j}\text{Demand}_{exposed}k, \sum_i \text{Demand}_{exposed} ij\right\}$$

$$\text{Demand } j = \sum_i \text{Demand } ij$$

where i is each child power controller/server below the power controller, j is the instant priority being considered, and k is all other priorities other than priority j being considered.

In order to provide an example of how these determinations would be conducted, using the determinations made for servers 402 and 404 as well as the exemplary individual characteristics associated with overcurrent protection device 306 from FIG. 3, for power controller 406, priority-aware power capping mechanism 340 would determine:

Constraint=min{Limit of power controller 406, Constraint of server 402+Constraint of server 404}=min{800, 600+600}=800

Pcapmin 1=Pcapmin 1 of server 402+Pcapmin 1 of server 404=100+100=200

Demand$_{exposed}$ 1=min{Limit of power controller 406, Demand$_{exposed}$ 1 of server 402+Demand$_{exposed}$ 1 of server 404}=min{800, 600+600}=800

Demand 1=Demand 1 of server 402+Demand 1 of server 404=600+600=1200.

Using the determinations made for servers 412 and 414 as well as the exemplary individual characteristics associated with overcurrent protection device 316 from FIG. 3, for power controller 416, priority-aware power capping mechanism 340 would determine:

Constraint=min{Limit of power controller 416, Constraint of server 412+Constraint of server 414}=min{800, 600+600}=800

Pcapmin 0=Pcapmin 0 of server 412+Pcapmin 1 of
   server 414=100+100=200

$Demand_{exposed}$ 0=min{Limit of power controller 416,
   $Demand_{exposed}$ 0 of server 412+$Demand_{exposed}$ 0
   of server 414}=min{800, 300+300}=600

Demand 0=Demand 0 of server 412+Demand 0 of
   server 414=300+300=600.

Using the determinations made for servers 422 and 424 as well as the exemplary individual characteristics associated with overcurrent protection device 326 from FIG. 3, for power controller 426, priority-aware power capping mechanism 340 would determine:

Constraint=min{Limit of power controller 426, Constraint of server 422+Constraint of server 424}=min{800, 600+600}=800

Pcapmin 1=Pcapmin 1 of server 422+Pcapmin 1 of
   server 424=100+100=200

$Demand_{exposed}$ 1=min{Limit of power controller 426,
   $Demand_{exposed}$ 1 of server 422+$Demand_{exposed}$ 1
   of server 424}=min{800, 500+500}=800

Demand 1=Demand 1 of server 422+Demand 1 of
   server 424=500+500=1000.

Using the determinations made for servers 432 and 434 as well as the exemplary individual characteristics associated with overcurrent protection device 336 from FIG. 3, for power controller 436, priority-aware power capping mechanism 340 would determine:

Constraint=min{Limit of power controller 436, Constraint of server 432+Constraint of server 434}=min{800, 600+600}=800

Pcapmin 0=Pcapmin 0 of server 432+Pcapmin 1 of
   server 434=100+100=200

$Demand_{exposed}$ 0=min{Limit of power controller 436,
   $Demand_{exposed}$ 0 of server 432+$Demand_{exposed}$ 0
   of server 434}=min{800, 300+300}=600

Demand 0=Demand 0 of server 432+Demand 0 of
   server 434=300+300=600.

Using the determinations made for power controllers 406 and 416 as well as the exemplary individual characteristics associated with RPP 308 from FIG. 3, for power controller 408, priority-aware power capping mechanism 340 would determine:

Constraint=min{Limit of power controller 408, Constraint of power controller 406+Constraint of power controller 416}=min{1400, 800+800}=1400

Pcapmin 1=Pcapmin 1 of power controller 406=200

Pcapmin 0=Pcapmin 0 of power controller 416=200

$Demand_{exposed}$ 1=min{Limit of power controller
   408−Pcapmin 0 of power controller 408,
   $Demand_{exposed}$ 1 of power controller
   406}=min{1400−200, 800}=800

$Demand_{exposed}$ 0=min{Limit of power controller
   408−$Demand_{exposed}$ 1 of power controller 408,
   $Demand_{exposed}$ 0 of power controller
   416}=min{1400−800, 600}=600

Demand 1=Demand 1 of power controller 406=1200

Demand 0=Demand 0 of power controller 416=600.

Using the determinations made for power controllers 426 and 436 as well as the exemplary individual characteristics associated with RPP 328 from FIG. 3, for power controller 428, priority-aware power capping mechanism 340 would determine:

Constraint=min{Limit of power controller 428, Constraint of power controller 426+Constraint of power controller 436}=min{1400, 800+800}=1400

Pcapmin 1=Pcapmin 1 of power controller 426=200

Pcapmin 0=Pcapmin 0 of power controller 436=200

$Demand_{exposed}$ 1=min{Limit of power controller
   428−Pcapmin 0 of power controller 428,
   $Demand_{exposed}$ 1 of power controller
   426}=min{1400−200, 800}=800

$Demand_{exposed}$ 0=min{Limit of power controller
   428−$Demand_{exposed}$ 1 of power controller 428,
   $Demand_{exposed}$ 0 of power controller
   436}=min{1400−800, 600}=600

Demand 1=Demand 1 of power controller 426=1000

Demand 0=Demand 0 of power controller 436=600.

Using the determinations made for power controllers 408 and 428 as well as the exemplary individual characteristics associated with transformer 310 from FIG. 3, for power controller 410, priority-aware power capping mechanism 340 would determine:

Constraint=min{Limit of power controller 410, Constraint of power controller 408+Constraint of power controller 428}=min{2400, 1400+1400}=2400

Pcapmin 1=Pcapmin 1 of power controller 408+
   Pcapmin 1 of power controller 428=200+
   200=400

Pcapmin 0=Pcapmin 0 of power controller 408+
   Pcapmin 0 of power controller 428=200+
   200=400

$Demand_{exposed}$ 1=min{Limit of power controller
   410−Pcapmin 0 of power controller 410,
   $Demand_{exposed}$ 1 of power controller 408+$Demand_{exposed}$ 1 of power controller
   428}=min{2400−400, 800+800}=1600

$Demand_{exposed}$ 0=min{Limit of power controller
   410−$Demand_{exposed}$ 1 of power controller 410,
   $Demand_{exposed}$ 0 of power controller
   408=$Demand_{exposed}$ 0 of power controller
   428}=min{2400−1600, 600+600}=800

Demand 1=Demand 1 of power controller 408+Demand 1 of power controller 428=1200+1000=2200

Demand 0=Demand 0 of power controller 408+Demand 0 of power controller 428=600+600=1200.

With priority-aware power capping mechanism 340 determining the metrics for each of servers 402, 404, 412, 414, 422, 424, 432, and 434 as well as power controllers 406, 408, 410, 416, 426, 428, and 436 in the bottom-up process, priority-aware power capping mechanism 340 turns to the top-down process of assigning power budgets to each power controllers and eventually the power consumption devices for use as a throttling value when certain conditions are met based on a determined power budget. For each power controller 406, 408, 410, 416, 426, 428, and 436, priority-aware power capping mechanism 340 performs a three-step operation to determine the power budget assigned child power controllers/servers:

Assign minimum power budget by assigning the determined priority Pcapmin j to each child based on the child's priority.

Assign demanded power budget by, from high priority to low priority, at each priority. If the remaining power budget is enough to satisfy the remaining $Demand_{exposed}$ j of the priority, further assign each child its remaining $Demand_{exposed}$ j of the priority. If the remaining power budget fails to be enough to satisfy the remaining $Demand_{exposed}$ j of the priority, priority-aware power capping mechanism 340 utilizes a supplemental algorithm to break up the remaining power budget to each child, with the condition that each priority of each child does not receive a total power budget that exceeds its $Demand_{exposed}$ j of the priority. The supplemental algorithm may be, for example, an equal proportion algorithm, a high-demand cut-first algorithm, or the like. Equal proportion assigns a same percentage to all children nodes of their (remaining) demanded power (i.e. the amount of demand beyond Pcapmin) when the full demand cannot be satisfied. High-demand cut-first removes budget from the highest power consuming children nodes until they match lower power consuming children nodes, which is repeated until the power budget is acceptable.

If the remaining power budget is enough to satisfy the remaining $Demand_{exposed}$ j of the priority and there remains unassigned power from the power budget, assign the remaining unassigned power budget to each child, with the condition that each child does not receive a total power budget that exceeds its constraint using a supplemental algorithm, such as for example, an equal proportion algorithm, a high-demand cut-first algorithm, or the like.

Figure 5:
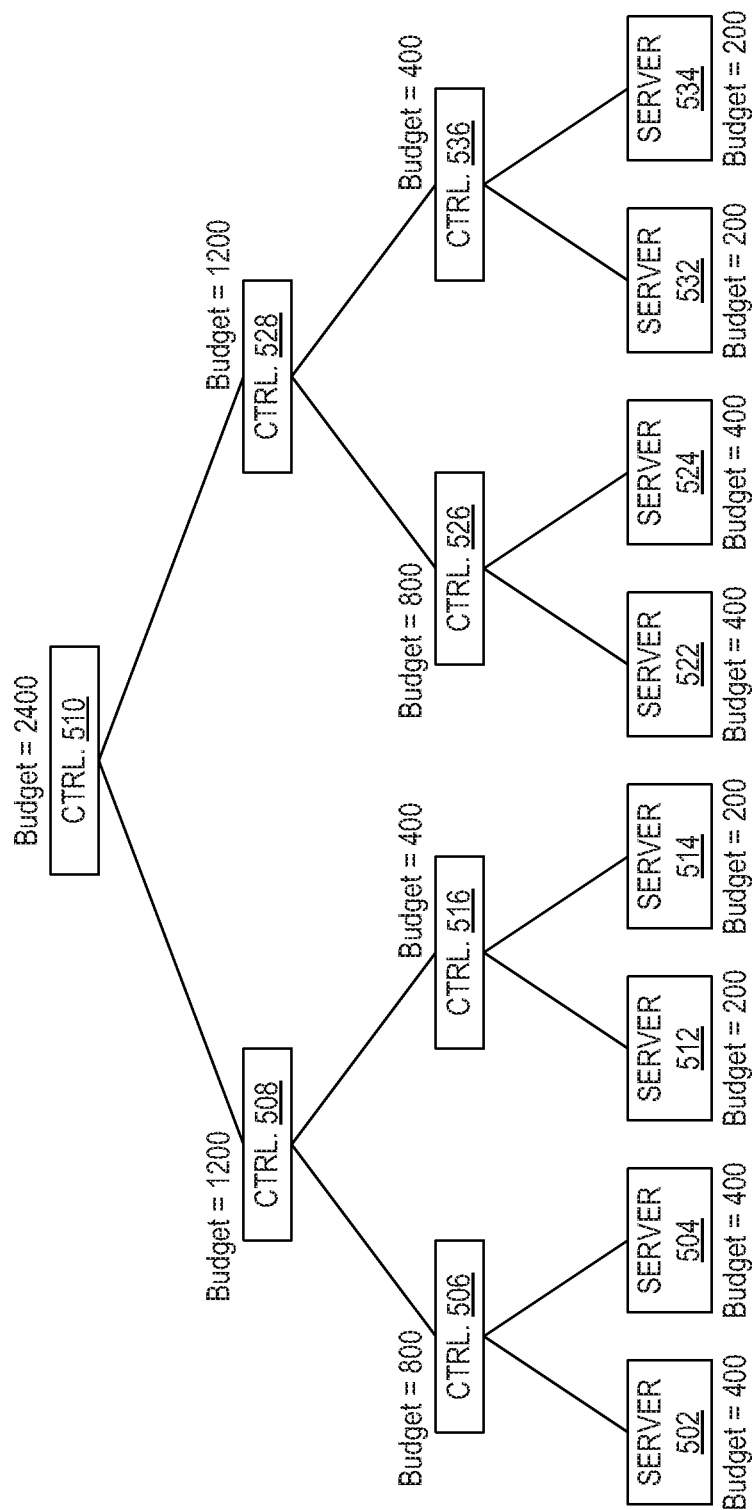
FIG. 5 illustrates assigned power budgets to each power controller/server in accordance with an illustrative embodiment.

Following these procedures, priority-aware power capping mechanism 340 determines the power budgets to each power controller/server, as is illustrated in FIG. 5 in accordance with an illustrative embodiment. As with FIG. 4, power distribution network 500 of FIG. 5 comprises servers 502, 504, 512, 514, 522, 524, 532, and 534 that are power consumption devices that mirror servers 302, 304, 312, 314, 322, 324, 332, and 334 of FIG. 3 as well as power controllers 506, 516, 526, and 536 that mirror the power distribution devices of overcurrent protection devices 306, 316, 326, and 336 of FIG. 3; power controllers 508 and 528 that mirror the power distribution device of RPPs 308 and 328 of FIG. 3; and power controller 510 that mirrors the power distribution device of transformer 310 of FIG. 3. In the example, an equal proportion algorithm is used as the supplemental algorithm, which distributes power proportionally to each child. In detail, for step 2, each child receives a power budget proportionally to the difference of its Demand j and Pcapmin j of the priority. Then for step 3, each child receives a power budget proportionally to the difference of its total Demand j and total Pcapmin j for all its priorities.

For example, using the exemplary metrics identified in FIG. 4 and the three-step operation identified above for power controller 510, priority-aware power capping mechanism 340 would determine:

| | Remaining Budget | Budget of power controller 508 | | Budget of power controller 528 | |
|---|---|---|---|---|---|
| | | Priority 1 | Priority 0 | Priority 1 | Priority 0 |
| Step 1 | 2400 | 200 | 200 | 200 | 200 |
| Step 2 | 2400 − 200 − 200 − 200 − 200 = 1600 | 800 − 200 = 600 | (1600 − 600 − 600) * ((600 − 200)/ ((600 − 200) + (600 − 200)) = 200 | 800 − 200 = 600 | (1600 − 600 − 600) * ((600 − 200)/ ((600 − 200) + (600 − 200)) = 200 |
| Step 3 | 1600 − 600 − 200 − 600 − 200 = 0 | 0 | 0 | 0 | 0 |
| Total | 0 | 200 + 200 + 600 + 200 + 0 + 0 = 1200 | | 200 + 200 + 600 + 200 + 0 + 0 = 1200 | |

Using the exemplary metrics identified in FIG. 4 and the three operations identified above for power controller 508, priority-aware power capping mechanism 340 would determine:

| | Remaining Budget | Budget of power controller 506 | | Budget of power controller 516 | |
|---|---|---|---|---|---|
| | | Priority 1 | Priority 0 | Priority 1 | Priority 0 |
| Step 1 | 1200 | 200 | — | — | 200 |
| Step 2 | 1200 − 200 − 200 = 800 | 800 − 200 = 600 | — | — | 800 − 600 = 200 |
| Step 3 | 800 − 600 − 200 = 0 | 0 | — | — | 0 |
| Total | 0 | 200 + 600 + 0 = 800 | | 200 + 200 + 0 = 400 | |

Using the exemplary metrics identified in FIG. 4 and the three operations identified above for power controller 528, priority-aware power capping mechanism 340 would determine:

| | Remaining Budget | Budget of power controller 526 | | Budget of power controller 536 | |
|---|---|---|---|---|---|
| | | Priority 1 | Priority 0 | Priority 1 | Priority 0 |
| Step 1 | 1200 | 200 | — | — | 200 |
| Step 2 | 1200 − 200 − 200 = 800 | 800 − 200 = 600 | — | — | 800 − 600 = 200 |
| Step 3 | 800 − 600 − 200 = 0 | 0 | — | — | 0 |
| Total | 0 | 200 + 600 + 0 = 800 | | 200 + 200 + 0 = 400 | |

Using the exemplary metrics identified in FIG. 4 and the three operations identified above for power controller 506, priority-aware power capping mechanism 340 would determine:

|  | Budget of Server 502 | | Budget of Server 504 | |
|---|---|---|---|---|
| Remaining Budget | Priority 1 | Priority 0 | Priority 1 | Priority 0 |
| Step 1 | 800 | 100 | — | 100 | — |
| Step 2 | 800 − 100 − 100 = 600 | 600 * ((600 − 100)/((600 − 100) + (600 − 100))) = 300 | — | 600 * ((600 − 100)/((600 − 100) + (600 − 100))) = 300 | — |
| Step 3 | 600 − 300 − 300 = 0 | 0 | — | 0 | — |
| Total | 0 | 100 + 300 + 0 = 400 | | 100 + 300 + 0 = 400 | |

Using the exemplary metrics identified in FIG. 4 and the three operations identified above for power controller 516, priority-aware power capping mechanism 340 would determine:

|  | Budget of Server 512 | | Budget of Server 514 | |
|---|---|---|---|---|
| Remaining Budget | Priority 1 | Priority 0 | Priority 1 | Priority 0 |
| Step 1 | 400 | — | 100 | — | 100 |
| Step 2 | 400 − 100 − 100 = 200 | — | 200 * ((300 − 100)/((300 − 100) + (300 − 100))) = 100 | — | 200 * ((300 − 100)/((300 − 100) + (300 − 100))) = 100 |
| Step 3 | 200 − 100 − 100 = 0 | — | 0 | — | 0 |
| Total | 0 | | 100 + 100 + 0 = 200 | | 100 + 100 + 0 = 200 |

Using the exemplary metrics identified in FIG. 4 and the three operations identified above for power controller 526, priority-aware power capping mechanism 340 would determine:

|  | Budget of Server 522 | | Budget of Server 524 | |
|---|---|---|---|---|
| Remaining Budget | Priority 1 | Priority 0 | Priority 1 | Priority 0 |
| Step 1 | 800 | 100 | — | 100 | — |
| Step 2 | 800 − 100 − 100 = 600 | 600 * ((500 − 100)/((500 − 100) + (500 − 100))) = 300 | — | 600 * ((600 − 100)/((600 − 100) + (500 − 100))) = 300 | — |
| Step 3 | 600 − 300 − 300 = 0 | 0 | — | 0 | — |
| Total | 0 | 100 + 300 + 0 = 400 | | 100 + 300 + 0 = 400 | |

Using the exemplary metrics identified in FIG. 4 and the three operations identified above for power controller 526, priority-aware power capping mechanism 340 would determine:

|  | Budget of Server 532 | | Budget of Server 534 | |
|---|---|---|---|---|
| Remaining Budget | Priority 1 | Priority 0 | Priority 1 | Priority 0 |
| Step 1 | 400 | — | 100 | — | 100 |
| Step 2 | 400 − 100 − 100 = 200 | — | 200 * ((300 − 100)/((300 − 100) + (300 − 100))) = 100 | — | 200 * ((300 − 100)/((300 − 100) + (300 − 100))) = 100 |
| Step 3 | 200 − 100 − 100 = 0 | — | 0 | — | 0 |
| Total | 0 | | 100 + 100 + 0 = 200 | | 100 + 100 + 0 = 200 |

Using the unique priority-aware power capping solution as is illustrated in FIG. 3-5 that utilizes the power distribution hierarchy and associated characteristics as well as the priority assigned to each power consumption device, the power budgets associated to each of servers 302, 304, 312, 314, 322, 324, 332, and 334 by priority-aware power capping mechanism 340 causes each of servers 302, 304, 312, 314, 322, 324, 332, and 334 to implement one or more throttling mechanisms, such as dynamic voltage/frequency scaling, clock modulation, or the like, to adhere to design limitations of power distribution equipment or contractual limits. For example, throttling may occur when some or all power consumption devices reach: the power limits of power distribution devices in the power distribution network, the total power budget for the data center, or the like. By implementing such a unique priority-aware power capping solution, power performance under normal operating within the data center may be increased by 39% thereby allowing for 39% more power consumption devices to be added to the data center and improving overall data center performance and revenue. That is, the illustrative embodiments provide a unique priority-aware power capping solution that is no longer just for power failure situations.

Thus, the illustrative embodiments are intended to operate on a periodic interval so that the mechanisms are responsive to power load changes on the servers, priority changes of the servers, and loss of available power supply in the network from contractual changes or equipment failure. The illustrative embodiments may also be recomputed upon changes to the inputs (priority, demand power, or the like).

It is understood that power supplying devices are typically designed to be operated safely in overload conditions by design for short time intervals. The periodic time interval of the illustrative embodiments is intended to be much smaller than the time for the overcurrent protection devices to trip, or the time period at which power supplying devices may operate in an overload condition. Therefore, the illustrative embodiments will safely operate the data center even in the event of quick power consumption ramp rates.

It is further understood that lower levels of the hierarchy may compute at different (e.g. faster) time intervals than the higher levels. In this way, the lower level may be immediately responsive to power load changes and priority changes while operating within a budget provided from a higher level.

The illustrative embodiments may incorporate power consuming devices without a power capping feature by defining for them Pcapmin=Pcapmax=exposed demand power=demand power>expected power consumption and given a priority class higher than all power capping devices. This allows power capping and non-power capping devices to co-exist on a shared power distribution branch.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
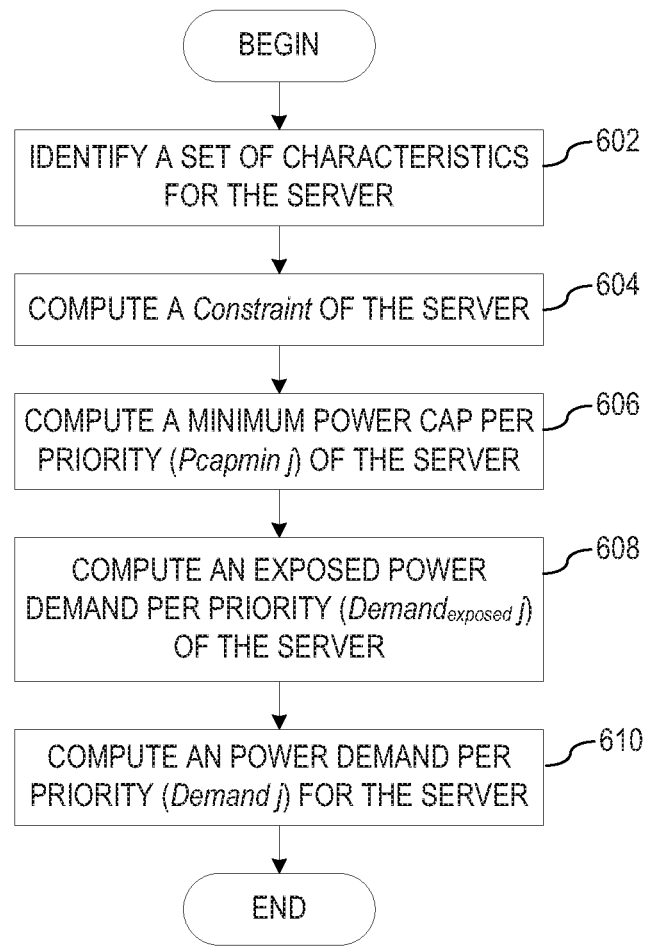
FIG. 6 depicts a flow diagram of the operation performed by a priority-aware power capping mechanism in determining a set of metrics for a server, i.e. a power consumption device, in a data center in accordance with an illustrative embodiment.

FIG. 6 depicts a flow diagram of the operation performed by a priority-aware power capping mechanism in determining a set of metrics for a server, i.e. a power consumption device, in a data center in accordance with an illustrative embodiment. As the operation begins, the priority-aware power capping mechanism identifies a set of characteristics for the server (step 602) including a Demand that refers to the power that the server currently desires to consume without enforcing any power caps, a Pcapmin that refers to the lowest power cap that the server can operate under, a Pcapmax that refers to the largest possible power cap that the server can operate under, and a priority j that is the instant priority of the server. The priority-aware power capping mechanism then computes a Constraint of the server (step 604) that is a maximum amount of power that is allowed to flow through server using the following formula:

$$\text{Constraint} = \text{Pcapmax}.$$

The priority-aware power capping mechanism then computes a minimum power cap per priority (Pcapmin j) of the server (step 606) that is minimum power budget that the server requires to receive for the assigned priority using the following formula:

$$\text{Pcapmin } j = \text{Pcapmin}.$$

The priority-aware power capping mechanism then computes an exposed power demand per priority (Demand$_{exposed}$ j) of the server (step 608) that is the power demand that the server exposes to its parent power controller for the assigned priority using the following formula:

$$\text{Demand}_{exposed} j = \max\{\text{Demand}, \text{Pcapmin}\}.$$

The priority-aware power capping mechanism then computes a power demand per priority (Demand j) for the server (step 610) that is the power demand that the server desires to utilize using the following formula:

$$\text{Demand } j = \max\{\text{Demand}, \text{Pcapmin}\}.$$

The operation ends thereafter.

Figure 7:
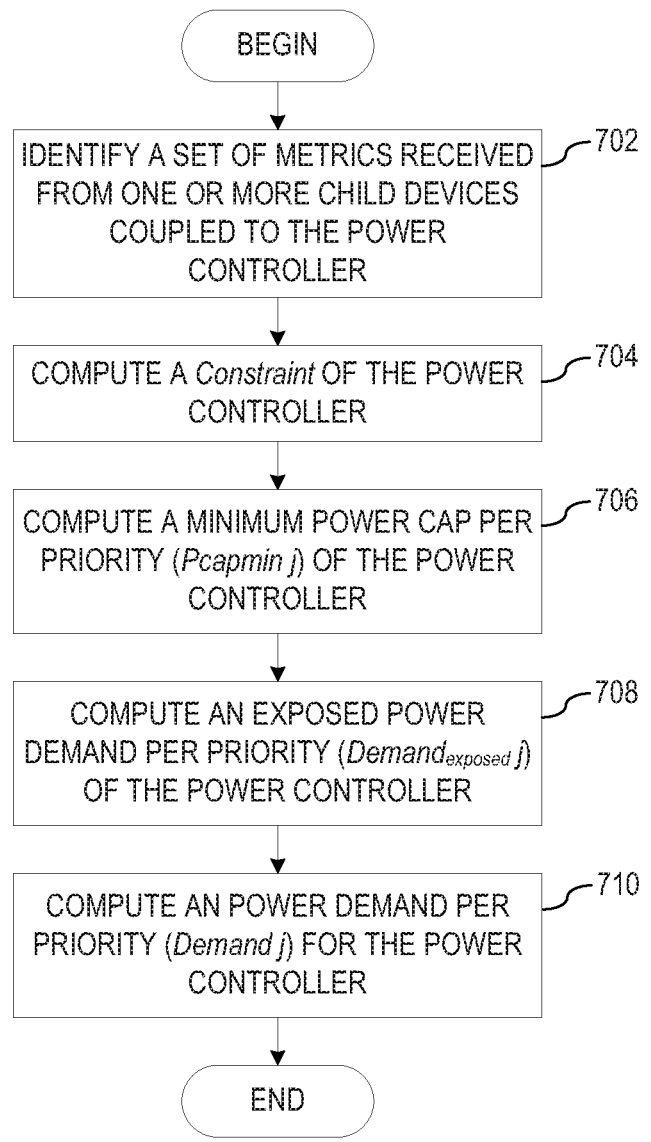
FIG. 7 depicts a flow diagram of the operation performed by a priority-aware power capping mechanism in determining a set of metrics for a power controller, i.e. a power distribution device, in a data center in accordance with an illustrative embodiment.

FIG. 7 depicts a flow diagram of the operation performed by a priority-aware power capping mechanism in determining a set of metrics for a power controller, i.e. a power distribution device, in a data center in accordance with an illustrative embodiment. As the operation begins, the priority-aware power capping mechanism identifies a set of metrics received from one or more child devices coupled to the power controller (step 702). Using this set of metrics, the priority-aware power capping mechanism computes a Constraint of the power controller (step 704) that is a maximum amount of power that is allowed to flow through power controller using the following formula:

$$\text{Constraint} = \min\left\{\text{Limit}, \sum_i \text{Constraint } ij\right\}.$$

The priority-aware power capping mechanism then computes a minimum power cap per priority (Pcapmin j) of the power controller (step 706) that is minimum power budget that the power controller requires to receive for the assigned priority using the following formula:

$$Pcapmin\ j = \sum_i Pcapmin\ ij.$$

The priority-aware power capping mechanism then computes an exposed power demand per priority (Demand$_{exposed}$ j) of the power controller (step 708) that is the power demand that the power controller exposes to its parent power controller for the assigned priority using the following formula:

$$\text{Demand}_{exposed} j =$$

$$\min\left\{\text{limit} - \sum_{k<j} Pcapmin\ k - \sum_{k>j} \text{Demand}_{exposed} k, \sum_i \text{Demand}_{exposed} ij\right\}.$$

The priority-aware power capping mechanism then computes a power demand per priority (Demand j) for the power controller (step 710) that is the power demand that the power controller desires to utilize using the following formula:

$$\text{Demand } j = \sum_i \text{Demand } ij.$$

Throughout the operations of FIG. 7, i is each child power controller/server below the power controller, j is the instant priority being considered, and k is all other priorities other than priority j being considered. The operation ends thereafter.

Figure 8:
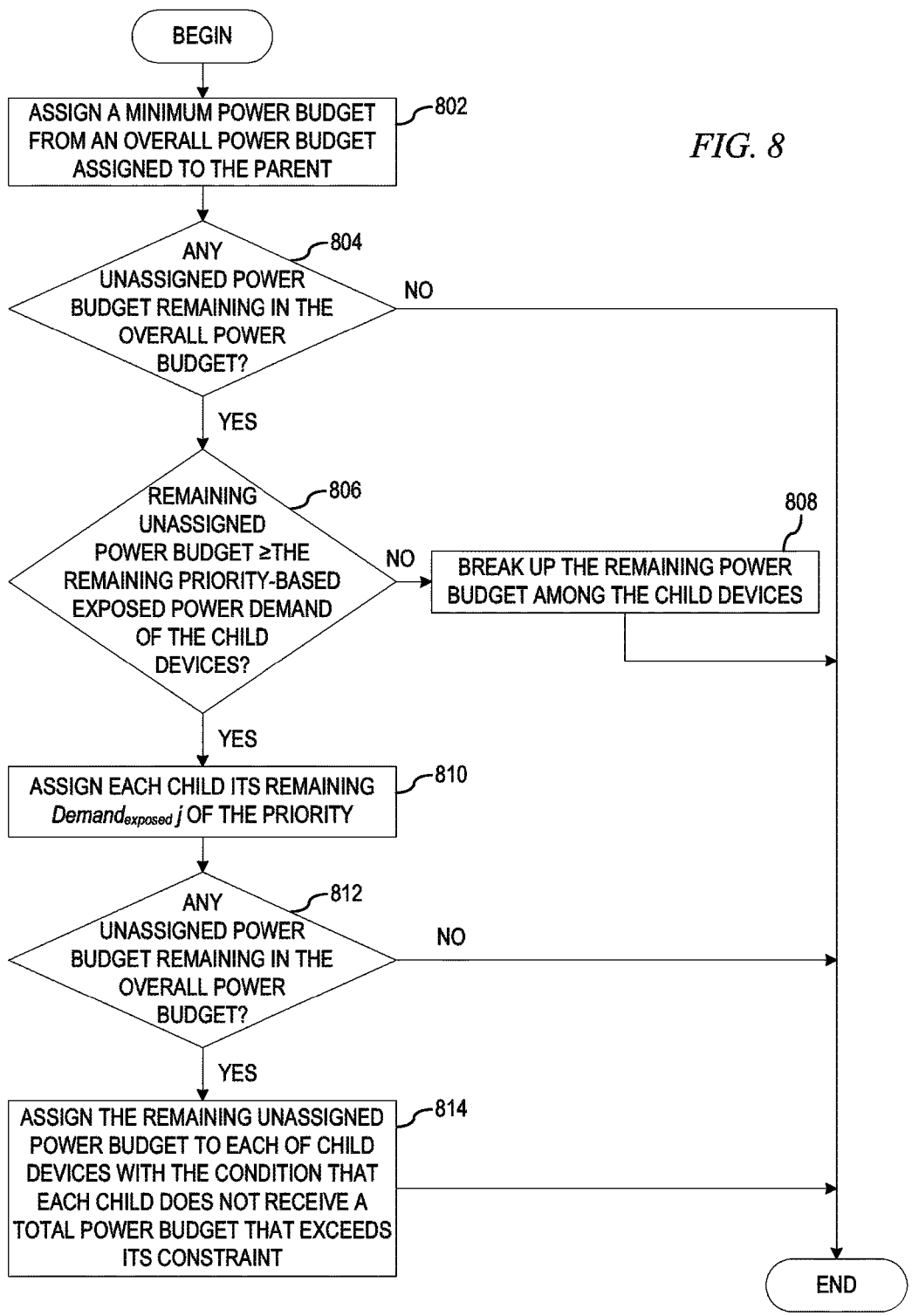
FIG. 8 depicts a flow diagram of the operation performed by a priority-aware power capping mechanism in assigning power budgets to each power controller and eventually to each power consumption device for use as a throttling value when certain conditions are met based on a determined power budget in accordance with an illustrative embodiment.

FIG. 8 depicts a flow diagram of the operation performed by a priority-aware power capping mechanism in assigning power budgets to each power controller and eventually to each power consumption device for use as a throttling value when certain conditions are met based on a determined power budget in accordance with an illustrative embodiment. As the operation begins, for each child device in a set of child device of a parent working from highest to lowest priority, the priority-aware power capping mechanism assigns a minimum power budget, from an overall power budget assigned to the parent, by assigning the determined priority Pcapmin j to each child based on the child's priority (step 802). The priority-aware power capping mechanism determines whether there is any unassigned power budget remaining in the overall power budget (step 804). If at step 804 there is no unassigned power budget remaining in the overall power budget, the operation ends. If at step 804 there is unassigned power budget remaining in the overall power budget, the priority-aware power capping mechanism determines whether the remaining unassigned power budget is greater than or equal to the remaining priority-based exposed power demand value of the child devices (step 806).

If at step 806 the remaining unassigned power budget is less than the remaining priority-based exposed power demand value of the child devices, the priority-aware power capping mechanism utilizes a supplemental algorithm to break up the remaining power budget among the child devices (step 808), with the condition that each priority of each child does not receive a total power budget that exceeds its Demand$_{exposed}$ j of the priority. The supplemental algorithm may be, for example, an equal proportion algorithm, a high-demand cut-first algorithm, or the like. The operation ends thereafter. If at step 806 the remaining unassigned power budget is greater than or equal to the remaining priority-based exposed power demand value, the priority-aware power capping mechanism assigns each child its remaining Demand$_{exposed}$ j of the priority (step 810).

The priority-aware power capping mechanism then determines whether there is any unassigned power budget remaining in the overall power budget (step 812). If at step 812 there is no unassigned power budget remaining in the overall power budget, the operation ends. If at step 812 there is unassigned power budget remaining in the overall power budget, the priority-aware power capping mechanism assigns the remaining unassigned power budget to each of child devices (step 814) with the condition that each child does not receive a total power budget that exceeds its constraint using a supplemental algorithm, such as for example, an equal proportion algorithm, a high-demand cut-first algorithm, or the like. The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for allocating data center power to the power consumption devices. The mechanisms provide a unique priority-aware power capping solution that utilizes the power distribution hierarchy and associated characteristics as well as the priority assigned to each power consumption device to throttle the power consumption devices to adhere to design limitations of power distribution equipment or contractual limits. That is, every server receives its assigned power budget and enforce the power budget based on a condition being met, so that all the power limits in the data center will be respected. The illustrative embodiments capture the notion of priority by letting the servers with high priority receive a power budget such that they are throttled as less as possible before setting the power budgets to servers with low priority.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for throttling power utilized by a set of power consumption devices in the data processing system using priority-aware power capping, the method comprising:

for each child device in a set of child devices in the data processing system and working from a highest-priority child device to a lowest-priority child device, responsive to unassigned power budget remaining in the overall power budget after a minimum power budget value has been assigned to the child device based on an associated priority of the child device, assigning, by the priority-aware power capping mechanism, an additional power budget value equal to a remaining priority-based exposed power demand value of the child device to the child device in response to the remaining unassigned power budget being greater than or equal to the remaining priority-based demanded power value thereby forming a total power budget for the child device, wherein the child device is a power controller representing a power distribution device, wherein the priority-based exposed power demand value is determined using a set of metrics of the child device, wherein the set of metrics of the child device comprise at least an exposed power demand per priority (Demand$_{exposed}$ j), that is determined using the following formula:

$$\text{Demand}_{exposed} j = \min\left\{\text{Limit} - \sum_{k<j} Pcapmin\ k - \sum_{k>j} \text{Demand}_{exposed} k, \sum_{i} \text{Demand}_{exposed} ij\right\},$$

and wherein Limit is a design limitation of the child device, Pcapmin refers to the lowest power cap that the child device operates under, j is the instant priority being considered signifying an importance of the child device, i is each child power controller/server below the child device, and k is all other priorities other than priority j being considered; and responsive to design limitations of power distribution equipment in the data processing system or contractual limits of the data processing system being reached, implementing, by the priority-aware power capping mechanism, a throttling by each child device based on the total power budget assigned to the child device.

2. The method of claim 1, further comprising:

for each child device in the set of child devices in the data processing system and working from the highest-priority child device to the lowest-priority child device, responsive to unassigned power remaining in the overall power budget after assigning the minimum power budget value and after assigning the additional power budget value, assigning, by the priority-aware power capping mechanism, a further power budget value to the child device in a first predetermined manner thereby forming an updated total power budget for the child device; and responsive to design limitations of power distribution equipment in the data processing system or contractual limits of the data processing system being reached, implementing, by the priority-aware power capping mechanism, a throttling by each child device based on the updated total power budget assigned to the child device.

3. The method of claim 1, further comprising:

for each child device in the set of child devices in the data processing system and working from the highest-priority child device to the lowest-priority child device, responsive to unassigned power remaining in the overall power budget after assigning the minimum power budget value and responsive to the remaining unassigned power being less than the remaining priority-based demanded power value, assigning, by the priority-aware power capping mechanism, an additional power budget value to the child device in a second predetermined manner thereby forming an updated total power budget for the child device; and responsive to design limitations of power distribution equipment in the data processing system or contractual limits of the data processing system being reached, implementing, by the priority-aware power capping mechanism, a throttling by each child device based on the updated total power budget assigned to the child device.

4. The method of claim 3, wherein the second predetermined manner is selected from the group consisting of equal proportion and high-demand cut-first.

5. The method of claim 1, wherein the set of metrics of the child device further comprise at least one of a constraint or a minimum power cap per priority (Pcapmin j) that are determined using one or more of the following formulas:

$$\text{Constraint} = \min\left\{\text{Limit}, \sum_i \text{Constraint } ij\right\}, \text{ or}$$

$$\text{Pcapmin } j = \sum_i \text{Pcapmin } ij,$$

and wherein Constraint is a maximum amount of power that is allowed to flow through the child device, Limit is a design limitation of the child device, Pcapmin refers to the lowest power cap that the child device can operate under, j is the instant priority being considered signifying an importance of the child device, and i is each child power controller/server below the child device.

6. The method of claim 5, wherein the set metrics of the child device further comprise a power demand per priority (Demand j) that is determined using the following formula:

$$\text{Demand } j = \sum_i \text{Demand } ij,$$

and wherein Demand refers to the power that the child device currently desires to consume without enforcing any power caps, j is the instant priority being considered signifying an importance of the child device, and i is each child power controller/server below the child device.

7. The method of claim 1, wherein the first predetermined manner is selected from the group consisting of equal proportion and high-demand cut-first.

8. A computer program product comprising a computer readable storage medium having a computer readable program for throttling power utilized by a set of power consumption devices in the data processing system using priority-aware power capping stored therein, wherein the computer readable program, when executed on a computing device, causes the computing device to:

for each child device in a set of child devices in the data processing system and working from a highest-priority child device to a lowest-priority child device, responsive to unassigned power budget remaining in the overall power budget after a minimum power budget value has been assigned to the child device based on an associated priority of the child device, assign an additional power budget value equal to a remaining priority-based exposed power demand value of the child device to the child device in response to the remaining unassigned power budget being greater than or equal to the remaining priority-based demanded power value thereby forming a total power budget for the child device, wherein the child device is a power controller representing a power distribution device, wherein the priority-based exposed power demand value is determined using a set of metrics of the child device, wherein the set of metrics of the child device comprise at least an exposed power demand per priority (Demand$_{exposed}$ j), that is determined using the following formula:

$$\text{Demand}_{exposed} j = \min\left\{\text{Limit} - \sum_{k<j} \text{Pcapmin } k - \sum_{k>j} \text{Demand}_{exposed} k, \sum_i \text{Demand}_{exposed} ij\right\},$$

and wherein Limit is a design limitation of the child device, Pcapmin refers to the lowest power cap that the child device operates under, j is the instant priority being considered signifying an importance of the child device, i is each child power controller/server below the child device, and k is all other priorities other than priority j being considered; and responsive to design limitations of power distribution equipment in the data processing system or contractual limits of the data processing system being reached, implement a throttling by each child device based on the total power budget assigned to the child device.

9. The computer program product of claim 8, wherein the computer readable program further causes the computing device to:

for each child device in the set of child devices in the data processing system and working from the highest-priority child device to the lowest-priority child device, responsive to unassigned power remaining in the overall power budget after assigning the minimum power budget value and after assigning the additional power budget value, assign a further power budget value to the child device in a first predetermined manner thereby forming an updated total power budget for the child device; and responsive to design limitations of power distribution equipment in the data processing system or contractual limits of the data processing system being reached, implement a throttling by each child device based on the updated total power budget assigned to the child device.

10. The computer program product of claim 8, wherein the computer readable program further causes the computing device to:
for each child device in the set of child devices in the data processing system and working from the highest-priority child device to the lowest-priority child device, responsive to unassigned power remaining in the overall power budget after assigning the minimum power budget value and responsive to the remaining unassigned power being less than the remaining priority-based demanded power value, assign an additional power budget value to the child device in a second predetermined manner thereby forming an updated total power budget for the child device; and
responsive to design limitations of power distribution equipment in the data processing system or contractual limits of the data processing system being reached, implement a throttling by each child device based on the updated total power budget assigned to the child device.

11. The computer program product of claim 10, wherein the second predetermined manner is selected from the group consisting of equal proportion and high-demand cut-first.

12. The computer program product of claim 8, wherein the set of metrics of the child device further comprise at least one of a constraint or a minimum power cap per priority (Pcapmin j) that are determined using one or more of the following formulas:

$$\text{Constraint} = \min\left\{\text{Limit}, \sum_i \text{Constraint } ij\right\}, \text{ or}$$

$$\text{Pcapmin } j = \sum_i \text{Pcapmin } ij,$$

and
wherein Constraint is a maximum amount of power that is allowed to flow through the child device, Limit is a design limitation of the child device, Pcapmin refers to the lowest power cap that the child device can operate under, j is the instant priority being considered signifying an importance of the child device, and i is each child power controller/server below the child device.

13. The computer program product of claim 12, wherein the set of metrics of the child device further comprise a power demand per priority (Demand j) that is determined using the following formula:

$$\text{Demand } j = \sum_i \text{Demand } ij,$$

and
wherein Demand refers to the power that the child device currently desires to consume without enforcing any power caps, j is the instant priority being considered signifying an importance of the child device, and i is each child power controller/server below the child device.

14. An apparatus for throttling power utilized by a set of power consumption devices in the data processing system using priority-aware power capping comprising:
a processor; and
a memory coupled to the processor, wherein the memory comprises instructions which, when executed by the processor, cause the processor to:
for each child device in a set of child devices in the data processing system and working from a highest-priority child device to a lowest-priority child device, responsive to unassigned power budget remaining in the overall power budget after a minimum power budget value has been assigned to the child device based on an associated priority of the child device, assign an additional power budget value equal to a remaining priority-based exposed power demand value of the child device to the child device in response to the remaining unassigned power budget being greater than or equal to the remaining priority-based demanded power value thereby forming a total power budget for the child device, wherein the child device is a power controller representing a power distribution device, wherein the priority-based exposed power demand value is determined using a set of metrics of the child device, wherein the set of metrics of the child device comprise at least an exposed power demand per priority (Demand$_{exposed}$ j), that is determined using the following formula:

$$\text{Demand}_{exposed} j = \min\left\{\text{Limit} - \sum_{k<j} \text{Pcapmin } k - \sum_{k>j} \text{Demand}_{exposed} k, \sum_i \text{Demand}_{exposed} ij\right\},$$

and
wherein Limit is a design limitation of the child device, Pcapmin refers to the lowest power cap that the child device operates under, j is the instant priority being considered signifying an importance of the child device, i is each child power controller/server below the child device, and k is all other priorities other than priority j being considered; and
responsive to design limitations of power distribution equipment in the data processing system or contractual limits of the data processing system being reached, implement a throttling by each child device based on the total power budget assigned to the child device.

15. The apparatus of claim 14, wherein the instructions further cause the processor to:
for each child device in the set of child devices in the data processing system and working from the highest-priority child device to the lowest-priority child device, responsive to unassigned power remaining in the overall power budget after assigning the minimum power budget value and after assigning the additional power budget value, assign a further power budget value to the child device in a first predetermined manner thereby forming an updated total power budget for the child device; and
responsive to design limitations of power distribution equipment in the data processing system or contractual limits of the data processing system being reached, implement a throttling by each child device based on the updated total power budget assigned to the child device.

16. The apparatus of claim 14, wherein the instructions further cause the processor to:
for each child device in the set of child devices in the data processing system and working from the highest-priority child device to the lowest-priority child device, responsive to unassigned power remaining in the overall power budget after assigning the minimumbudget value and responsive to the remaining unassigned power being less than the remaining priority-based demanded power value, assign an additional power budget value to the child device in a second predetermined manner thereby forming an updated total power budget for the child device; and responsive to design limitations of power distribution equipment in the data processing system or contractual limits of the data processing system being reached, implement a throttling by each child device based on the updated total power budget assigned to the child device.

17. The apparatus of claim 16, wherein the second predetermined manner is selected from the group consisting of equal proportion and high-demand cut-first.

18. The apparatus of claim 14, wherein the set of metrics of the child device further comprise at least one of a constraint or a minimum power cap per priority (Pcapmin j) that are determined using one or more of the following formulas:

$$\text{Constraint} = \min\left\{\text{Limit}, \sum_i \text{Constraint } ij\right\}, \text{ or}$$

$$\text{Pcapmin } j = \sum_i \text{Pcapmin } ij,$$

and wherein Constraint is a maximum amount of tower that is allowed to flow through the child device, Limit is a design limitation of the child device, Pcapmin refers to the lowest power cap that the child device can operate under, j is the instant priority being considered signifying an importance of the child device, and i is each child power controller/server below the child device.

19. The apparatus of claim 18, wherein the set of metrics of the child device further comprise a power demand per priority (Demand j) that is determined using the following formula:

$$\text{Demand } j = \sum_i \text{Demand } ij,$$

and wherein Demand refers to the power that the child device currently desires to consume without enforcing any power caps, j is the instant priority being considered signifying an importance of the child device, and i is each child power controller/server below the child device.

* * * * *